US 7,243,086 B2

(12) United States Patent
Polak (10) Patent No.: US 7,243,086 B2
(45) Date of Patent: Jul. 10, 2007

(54) METHODS AND SYSTEMS FOR AUTOMATICALLY GENERATING PROVABLY CORRECT COMPUTER PROGRAM CODE

(75) Inventor: Wolfgang H. Polak, Sunnyvale, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 396 days.

(21) Appl. No.: 10/739,187

(22) Filed: Dec. 19, 2003

(65) Prior Publication Data

US 2005/0137992 A1 Jun. 23, 2005

(51) Int. Cl.
*G06F 15/18* (2006.01)
*G06N 3/00* (2006.01)
*G06N 3/12* (2006.01)

(52) U.S. Cl. .............................. 706/13; 706/12; 706/59
(58) Field of Classification Search .................. 706/13, 706/12, 59; 395/13; 703/2
See application file for complete search history.

(56) References Cited

U.S. PATENT DOCUMENTS 5,136,686 A * 8/1992 Koza ........................... 706/13
5,867,397 A     2/1999 Koza et al.

* cited by examiner

*Primary Examiner*—Joseph P Hirl
(74) *Attorney, Agent, or Firm*—Sughrue Mion, PLLC; Joseph Bach (57) ABSTRACT

A provably correct computer program can be generated using genetic programming techniques. A desired behavior is used to define a formal specification. An initial population of programs is created where each program has a meaning that can be defined using a formalization technique. A fitness function is applied to measure a distance between the meaning of a program, i.e., its actual behavior, and the specification. Any program having a zero value as the measure of distance between the meaning of the program and the specification is determined to be provably correct. After the fitness of some or all of the programs in the current generation of programs has been computed, a provably correct program has not yet been found in the current generation, mutation and/or crossover techniques are performed on at least some of the fittest individuals in the current generation to create the programs of a next generation.

19 Claims, 5 Drawing Sheets

METHODS AND SYSTEMS FOR AUTOMATICALLY GENERATING PROVABLY CORRECT COMPUTER PROGRAM CODE

BACKGROUND OF THE INVENTION

1. Field of Invention

This invention relates to methods and systems for generating provably correct code using evolutionary algorithms.

2. Description of Related Art

Evolutionary algorithms are an application of genetic techniques to create and evolve computer programs from a random population of smaller programs. One object of evolutionary algorithms is to generate computer programs automatically without requiring time consuming human generation of the program code.

Evolutionary techniques start by creating an initial population of random programs that are analogous to chromosomes. This initial population is repeatedly evolved through genetic operations into new populations (generations) until a program is evolved which returns the correct solution for the test cases. Programs are individually selected from the population for testing. The fitness of an individual program from the population is determined by running the program on one or more test cases. A measure of an individual program's ability to correctly perform the test cases is used to select the fittest individuals from the population. Individuals are then selected and subjected to mutation and cross-over operations to form another population of programs of the next generation. Individual programs with better fitness are selected with higher probability. This process is repeated until the population contains at least one individual that passes all or sufficiently many of the test cases.

SUMMARY OF THE DISCLOSURE

Evolutionary algorithms have been demonstrated to be successful in a number of areas, particularly in areas where the fitness of an individual program can be easily quantified through testing. However, like handwritten code, because the fitness of each individual program is evaluated by testing, there is no guarantee that the selected program will work for anything outside the tested domain. Due to overfitting tendencies inherent to evolved programs, the fitness limitation can be more acute for evolutionary algorithms than for human generated code. Thus, the practical application of genetic programming techniques has been largely limited to domains where programs can be fully validated solely by testing.

This invention provides methods and systems that use formal specifications of desired program behavior to evolve programs that meet the specification.

This invention separately provides system and methods that create a fitness function usable to measure the fitness of individual programs with respect to a given specification.

This invention separately provides system and methods that use evolutionary algorithms to evolve program code that can be validated beyond testing.

In various exemplary embodiments of the systems and methods according to this invention, a fitness function is used to measure the fitness of individual programs. The fitness of an individual program is taken to be the distance between the actual behavior of the individual program and the desired behavior, as measured by the fitness function. In various exemplary embodiments, the value of this fitness function is zero if the actual behavior is provably equal to the desired behavior. This means that the program will behave as required for all possible inputs or test cases, even if the number of different possible inputs is infinite.

In various exemplary embodiments of the systems and methods according to this invention, to evolve a program to satisfy a given specification, an initial population of programs is created. In various exemplary embodiments, the individual programs may include random programs or quasi-random programs programs. The fitness of each program in the population is determined using a fitness function to compute the distance between the meaning or behavior of each program and the given specification. Programs with smaller distance are fitter. If, at any point during the fitness computation a program in the population is determined to have fitness of zero, i.e., a zero distance, evolution stops and the program is returned. Otherwise, fitness computation is performed on each program in the population and the results are ranked. A new population of programs is created by repeatedly performing a combination of mutation and/or crossover operations on one or more of the more fit programs of the current generation as determined by the ranking. After the new population is created, the fitness of each individual is again evaluated and the process repeats until a program having distance zero is evolved.

In various exemplary embodiments, the systems and methods according to this invention can be used in combination with traditional fitness functions that are based on program testing by using a fitness function that depends on the distance between the actual program behavior and the desired program behavior as well as the result of program testing.

These and other features and advantages of various exemplary embodiments of systems and methods according to this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
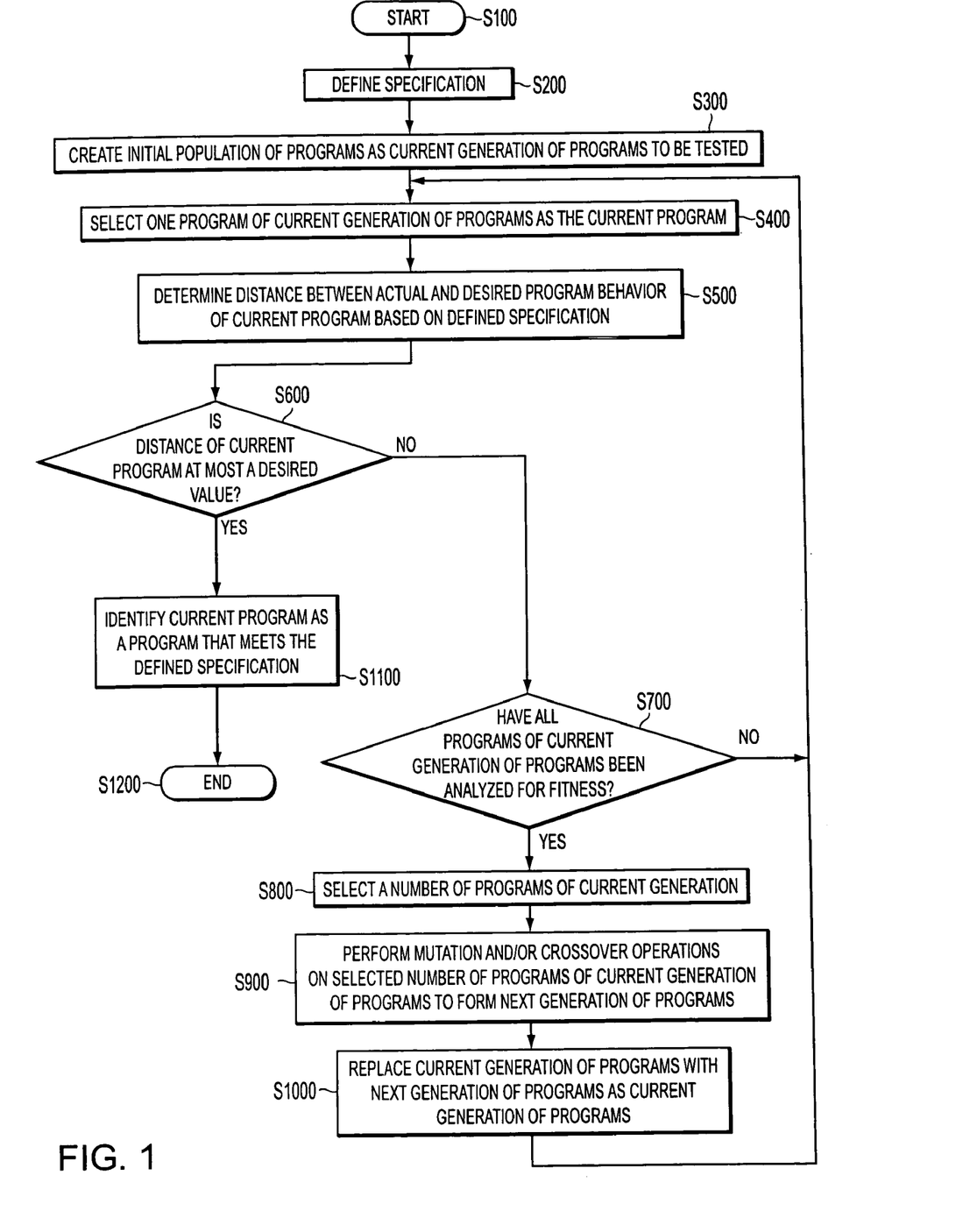
FIG. 1 is a flowchart outlining one exemplary embodiment of a method for evolving computer code according to this invention.

FIG. 1 is a flowchart outlining one exemplary embodiment of a method for generating provably correct code using genetic programming techniques according to this invention.

As shown in FIG. 1, operation of the method begins in step S100 and proceeds to step S200 where a formal specification is defined. In various exemplary embodiments, the formal specification states the problem to be solved by the evolved program. In various exemplary embodiments, the specification will take the form of a mathematical expression. In various other exemplary embodiments, the specification will take the form of a more abstract expression or even specify the behavior of a complex system. Next, in step S300, an initial population of programs is created as a current generation of programs. Then, in step S400, an individual program of the current generation of programs is selected for fitness evaluation as the current program. Operation then continues to step S500.

In step S500, the current program is analyzed to determine the distance between the actual program behavior and the desired program behavior based on the defined specification. Then, in step S600, a determination is made whether the distance of the current program is at most a desired value. If so, operation jumps to step S1200. Otherwise, operation continues to step S800, where a determination is made whether the fitness has been computed for all individuals of the current generation of programs. If not, processing returns to step S400. Otherwise, processing continues to step S800.

In step S800, a determined number of programs from the current generation of programs, preferring those with lower distance values, are selected from the list. In various exemplary embodiments, these programs are selected randomly from the list. Then, in step S900, mutation and/or crossover operation are performed on the selected programs of the current generation of programs to create the programs of a next generation of programs. Next, in step S1000, the next generation of programs replaces the current generation of programs as the new current generation of programs. Operation then again returns to step S400. In contrast, in step S1100, the program with distance of zero is identified as a program that meets the defined specification. Operation then continues S1200, where operation of the method ends.

In various exemplary embodiments, the programs generated in step S300 are human-generated code. In various other exemplary embodiments, these programs are computer-generated code. Each program of the initial population may perform a single function or, alternatively, one or more program may perform multiple functions. Various techniques are known in the art for creating programs. Systems and methods according to this invention may use any known or later developed technique for generating the initial population of programs. Moreover, it should also be understood that systems and methods according to this invention can be used to evolve programs written in any known or later-developed programming and/or design language. For example, any of the commonly used programming languages, such as C, C++, Fortran, LISP or the like, or a more abstract design language, such as that used for describing finite automata, regular expressions or processes, may be used with the systems and methods according to this invention so long as there is a formal definition of the semantics of the programming or design language.

In various exemplary embodiments, a fitness of an individual program is quantified by the difference between that program's meaning, i.e., the actual behavior of that program, and the desired program behavior as defined by the specification. In various exemplary embodiments, fitness is determined based on a fitness algorithm. The fitness algorithm determines a distance function that measures how different the actual behavior of the program is from the specified behavior. The algorithm should return a distance of zero only if the program satisfies the specification in all cases.

In various exemplary embodiments, the determined threshold used in step S600 is zero. In various other exemplary embodiments, it is sufficient for the distance to be within an acceptable tolerance of zero.

Figure 2:
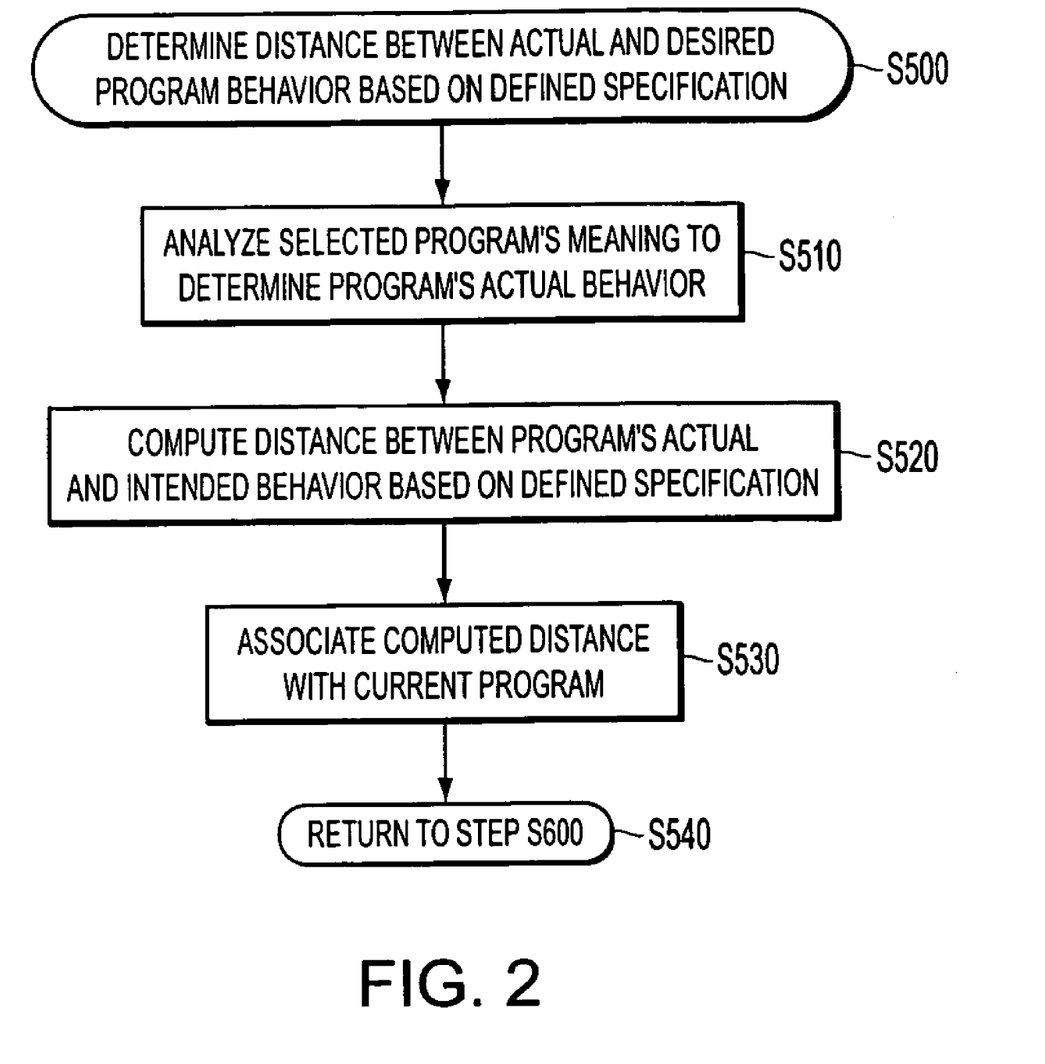
FIG. 2 is a flowchart outlining in greater detail one exemplary embodiments of a method for determining individual program fitness according to this invention.

FIG. 2 is a flowchart outlining in greater detail one exemplary embodiment of the method for determining the distance between actual program behavior of an individual program and the desired program behavior of the specification. As shown in FIG. 2, operation begins in step S500, and proceeds to step S510, where the current program is analyzed to determine the meaning of the program, i.e., the actual behavior of the program. Then, in step S520, the distance between the meaning or actual behavior and the desired behavior, as defined by the specification, is measured. In various exemplary embodiments, the fitness function quantifies the difference between the program's meaning and the formal specification of the desired program behavior as a unit of distance. Next, in step S530, the determined distance value is associated with the current program. Then, in step S540, processing returns to step S600.

In general, the equivalence of program behaviors is difficult to determine. Thus, in various exemplary embodiments, it may not be possible to implement a fitness algorithm that returns a distance value of zero if and only if a program perfectly satisfies the specification, except for cases that have very restrictive specifications. Accordingly, in various exemplary embodiments of systems and methods according to this invention, it will be sufficient to determine the distance value such that the distance value is zero for some, but not necessarily all, programs that fully meet the specification. Furthermore, in various exemplary embodiments, it is permissible to determine a distance value that is imprecise so long as its value is zero only if the actual program behavior is identical to the desired program behavior.

In various exemplary embodiments of the systems and methods according to this invention, in order to use the distance between the meaning of a program and a formal specification, several things will be useful. Firstly, it will be useful to select an appropriate programming or design language within which to operate. The programming language may be any of the commonly used programming languages including C, C++, Fortran or any other appropriate language, or a more abstract design language such as that used for describing finite state automata, regular expressions or processes including process algebra, CHSM, CCS or CSP, can be used. The programming or design language should be well defined and should possess a formal definition its semantics. Next, a formal specification of the desired program behavior should be provided. This formal specification will defined the desired program behavior of the evolved program. Finally, a fitness algorithm should be created that can be used to determine a distance function that gives a reasonably accurate measure of the difference between the actual behavior of a program and the behavior specified in the specification. In various exemplary embodiments, this algorithm should return a distance of zero only if the program satisfies the specification in all respects.

There are at least three techniques that can be used with various exemplary embodiments of systems and methods according to this invention to determine the fitness of an individual program. In a model checking technique, specifications are given through temporal logic formulas. Formal analysis techniques reduce a given program to a finite state representation. If the specification holds for all states of the reduced representation, the given program will satisfy the specification. A fitness measure can be defined by counting or approximating the number of counter examples found by the model checker.

In an axiomatic semantics technique, the specification of the intended behavior is expressed through logical formulas called pre- and post-conditions and invariants that annotate various points of the program text. A set of logical formulas, called verification conditions, can be generated efficiently, such that a program is correct with respect to the specification if all verification conditions can be proven to be true. A distance measure based on an axiomatic semantics technique would need to determine how far from true a particular verification condition is. It should be noted that logical formulas are partially ordered with respect to implication. Thus, in various exemplary embodiments, such an axiomatic semantics technique should assign a numeric value to formulas, such that the order of the numeric value is approximately consistent with the implication order.

A denotational semantics technique can also be used to determine the distance measure value. Denotational semantics formalizes the meaning of computer programs. Denotational semantics generally makes use of techniques of functional programming to describe computer languages, architectures and programs. Denotational semantics techniques translate programs into functions about which properties can be proved using standard mathematical theories of functions, especially domain theory. In this technique, the meaning of a program is defined by a mapping that assigns an element of a suitable mathematical structure to each individual program element. In this technique, a specification is simply a description of a particular element of this structure. An individual program is correct with respect to a specification if its meaning is equal to that of the specified element. Alternatively, a specification can be defined as a set of possible or allowable denotations. In this case, a program is correct with respect to such a specification if the meaning of the program is equal to one of the denotations of the set. The distance between a program and a specification can be determined by determining an approximation to the distance between the meaning of the program and the specification in the underlying mathematical structure. This is possible when the denotations form a metric space.

In one exemplary embodiment of an application of systems and methods according to this invention, denotational semantics techniques are used to generate provably correct computer code. The programming language used in this exemplary embodiment includes binary expressions with the mathematical operators addition (+), subtraction (−), and multiplication (·), the variable x and the constant 1. The result of evaluating an individual program is simply the value of the given expression, where x holds the program's input. The meaning of the individual program in this language is a polynomial over x. Executing the program will return the value of a polynomial for a given value of x. A domain appropriate for modeling the meaning of such a program is a set of finite unbounded tuples of integer coefficients. For instance, the tuple (1, 0, 1, 3), where each integer represents the coefficient on a power of x, staring with $x^0$ in the left most position of the tuple and incrementing by one for each position to the right, is the meaning of the program [(x+x+x+1)·x·x+1] or [(3x+1)·$x^2$+1]. However, there are infinitely many other programs that have this same meaning. In this domain, the Euclidean distance is a metric with the property that the meanings of two equal programs have the distance 0. The specification can be given as a tuple of integer numbers. The semantics of an individual program can be defined by mapping expressions into denotations. In this exemplary embodiment, a suitable function S for this example is:

$$S(1)=(1)$$

$$S(x)=(0, 1)$$

$$S(E_1+E_2)=S(E_1)+S(E_2)$$

$$S(E_1-E_2)=S(E_1)-S(E_2)$$

$$S(E_1 \cdot E_2)=S(E_1) \cdot S(E_2)$$

where + and − are defined component wise on tuples and the · product of two tuples is defined as:

$$(0) \cdot (b_0, \ldots, b_k)=(0)$$

$$(a_o, a_l, \ldots) \cdot (b_0, \ldots, b_k)=(a_0 b_0, \ldots a_0 b_k)+ (a_l, \ldots)+(0, b_o, \ldots, b_k)$$

Based on the language, the semantic definition S, and the Euclidean distance on tuples, programs were generated for a number of different specifications using a population size of 1000. Elitism was used, which ensures that the best individual program of one generation will be copied into the next generation. The initial programs were generated randomly with a maximum initial program size of 10 symbols. Mutation at a rate of 5% was used to replace a randomly selected subtree with a new random tree, or to select a random subtree as the mutation result. Cross-over was used to exchange random subtrees of two parents programs. Candidates for mutation and parents for cross-over were chosen by tournament selection with a tournament size of seven. Table 1 shows the specification, the generation number when a provably correct program was found, and the provably correct program itself:

TABLE 1

| Specification | Generation Number | Provably Correct Program |
| --- | --- | --- |
| (0, 2) | 0 | ((x + (x · ((x − 1) − (x − 1))) + x) |
|  | 0 | ((x + x) · 1) |
| (0, 0, 0, 0, 3) | 3 | ((x · (x + (x + ((x · 1) − (((1 · (1 + x)) + (1 + (x + x))) · (x − x)))))) · (1 · (x · x))) |
|  | 2 | (((x · (x · ((x + x) + x))) · (1 + (((1 − (1 + x)) · 1) + x))) · x) |
|  | 1 | ((x · (((1 · x) + x) + ((1 + ((1 · x) − (((x + 1) · x) + x))) + ((x − 1) + 1)))) · (x · x)) |
|  | 3 | ((x · (1 − (((1 − x) − x) − x))) · (((1 · x) · x) + (x − x))) |
| (1, −2, 3, −4) | 9 | (1 − (((((1 · x) · x) · (((x + (((x + (x − (1 − 1))) − (1 + 1)) · 1)) + x) · 1)) + ((x + x) − (x · x)))) |
|  | 4 | (((x · x) − x) + (1 − (x · ((1 − (x − x)) · 1)))) − ((((((x − 1) + x) − (1 − (x − 1))) + (1 · x)) · x) + x) · ((1 · 1) · x))) |
|  | 9 | (((1 · 1) − x) + (((((x − x) + x) · (((1 − x) − (((x + (x − (1 + 1))) + x) · (1 · 1))) + ((x · 1) − x))) − 1) · x)) |

"Correctness," in this example, means simply that the expression computes the correct polynomial as defined by the specification. "Correctness" is not concerned with other issues, such as the size of the expression or the efficiency of the computation. To account for the size of the expression, for example, the fitness function can be changed so that, rather than just returning a distance between the semantics of the programs and the specification, that distance and the size of the program, such as, for example, number of operators in the expression, can both be used in determining the "correctness." The ordering of fitness values is lexicographical, with the semantic distance being more important. Table 1 list three specifications, the generation where a correct program was found and the correct program itself. In Table 1, each specification indicates the coefficient on the defined powers of x, staring with $x^0$ at the left and incrementing by one.

A second exemplary embodiment of an application of systems and methods according to this invention synthesizes communication software. In this exemplary embodiment, a program that implements a sending process for the alternating bit protocol was developed. In this exemplary embodiment, a process algebra calculus of communicating systems (CCS) was used both as a programming language and as a specification language. In this exemplary embodiment, the denotational semantics of the process algebra language is given in terms of metric spaces. Distances in these spaces are used as a fitness function. The syntax of the language is a process algebra. Process algebra CCS can be used to describe processes that perform internal and external communications actions. Process algebra CCS supports operations for parallel execution of processes permitting accurate modeling of two way communications. Process algebra CCS also supports abstraction, i.e., hiding observable actions to turn them into unobservable internal ones. Abstraction is useful for modeling "black boxes" that perform internal operations, the specifics of which are not as important as the output.

Figure 3:
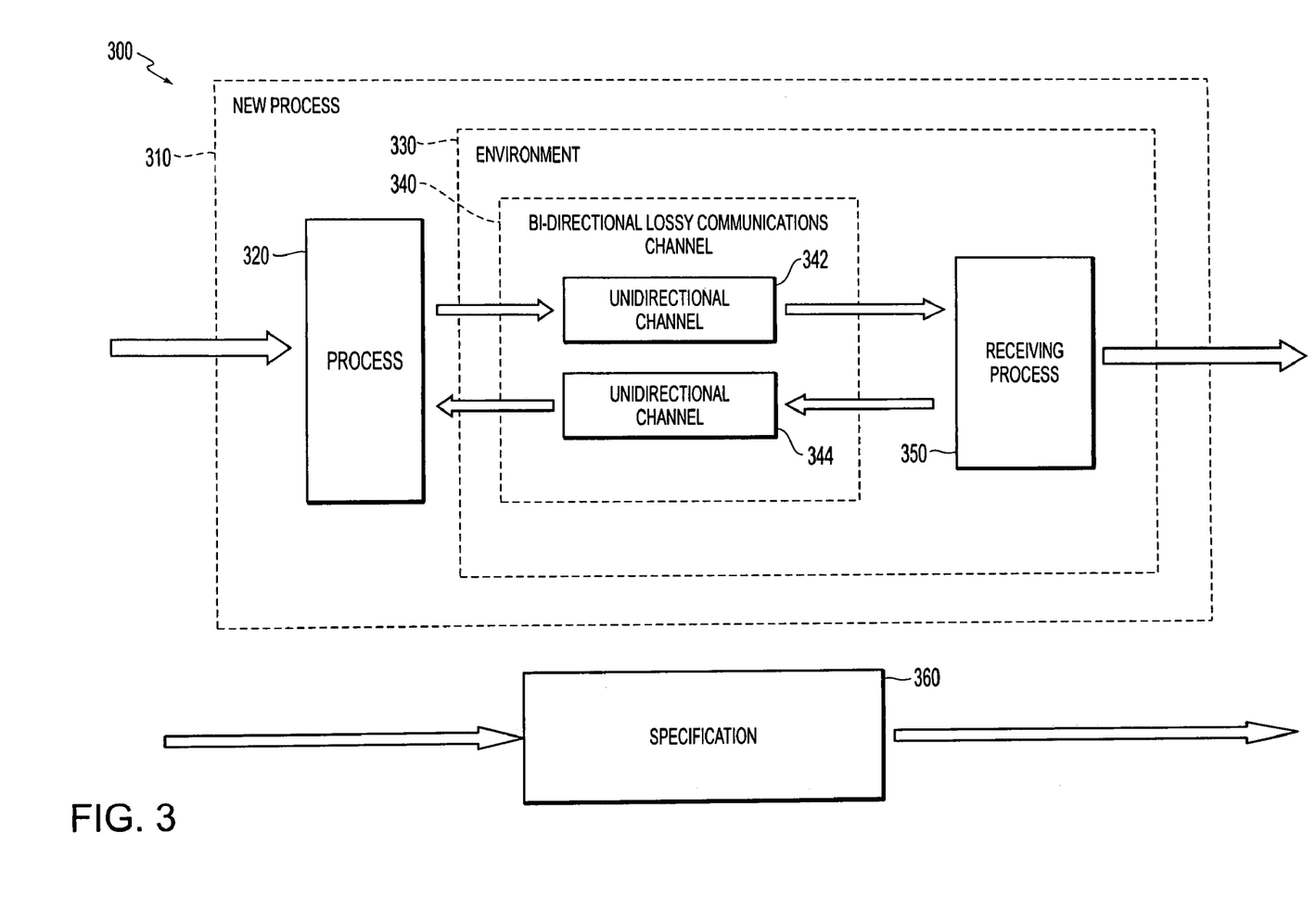
FIG. 3 is a block diagram illustrating elements of a communication system which define a specification for synthesizing communication software.

FIG. 3 illustrates one exemplary embodiment of the elements of a communication system that defines a specification 360 to be used in evolving part 320 of a communications software program 300 generated using various exemplary embodiments of systems and methods according to this invention. As shown in FIG. 3, a communication system 300 includes a process 320, that, when interacting with an environment 330, results in a behavior equivalent to the specification 360. FIG. 3 also illustrates one exemplary embodiment of a mechanism of abstraction and parallel execution. As shown in FIG. 3, a bi-directional lossy communications channel 340 is modeled by two unidirectional channels 342 and 344 operating in parallel. A receiving process 350 also operates in parallel with the bidirectional lossy communications channel 340. The bi-directional lossy communications channel 340 and the receiving process 350 together form a new process that models at least a portion of the environment 330. The local communication actions between the bi-directional lossy communications channel 340 and the receiving process 350 are hidden and not accessible to any process outside of the environment 330.

Various exemplary embodiments of the system and methods according to this invention are used to evolve the process 320, such that this process 320, when composed in parallel with the environment 330, after hiding communication actions between this process 320 and the environment 330, provides loss-free communication as specified by the specification 360. The specification 360 simply states that the sequence of input messages, after a possible delay, equals the sequence of output messages.

Figure 4:
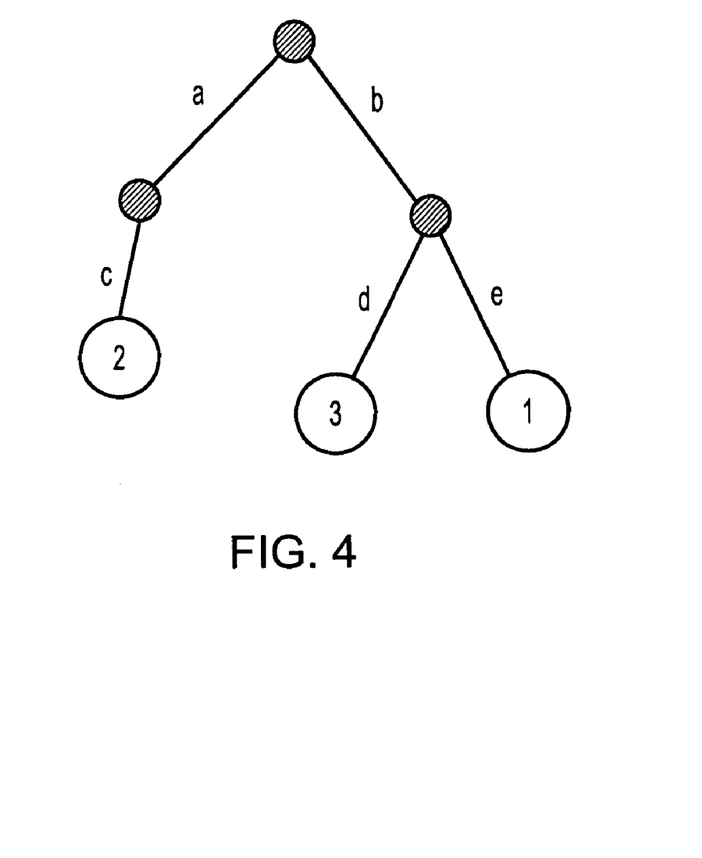
FIG. 4 is a tree diagram illustrating states of a finite state automation.

FIG. 4 is a tree diagram illustrating a chromosome used in the second exemplary embodiment shown in FIG. 3. In the context of FIG. 4, a chromosome is a tree, where each edge of the tree is labeled with some communication action represented by a letter and each terminal node is labeled with a number. All edges starting at the same node have distinct labels. The genetic operators used in this example are crossover and mutation that work by exchanging or replacing subtrees. In various exemplary embodiments, crossover will swap two randomly chosen sub-trees of two parent chromosomes and mutation will replace a randomly chosen sub-tree with a randomly generated sub-tree. Candidates for crossover and mutation are chosen through tournament selection. In various exemplary embodiments, a tournament size of seven is used in the tournament selection. However, it should be appreciated that a tournament size either larger or smaller than seven may be used without departing from the spirit or scope of this invention. A chromosome or tree is a representation of a finite state automation.

Figure 5:
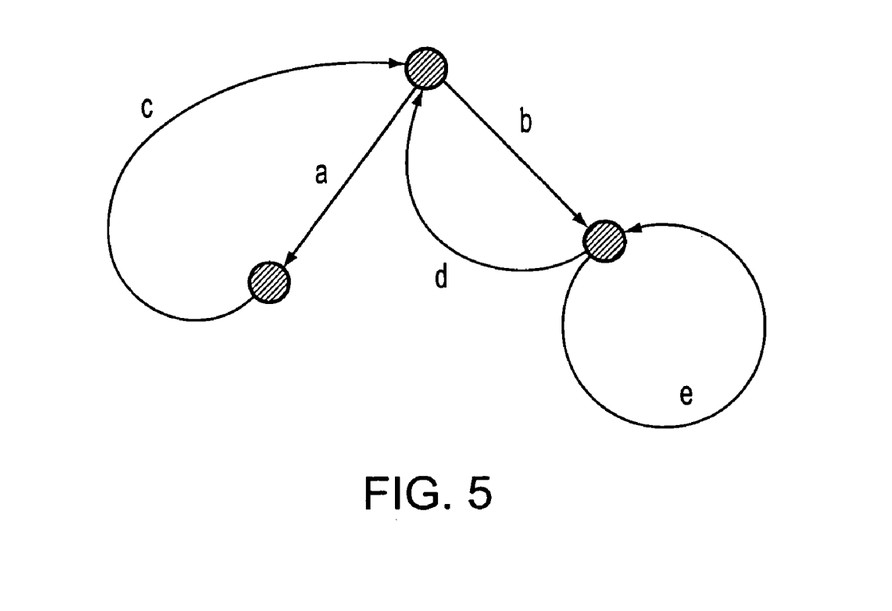
FIG. 5 is a cyclic graph defining a deterministic finite state automation.

FIG. 5 shows a finite state automation corresponding to the tree diagram of FIG. 4. The cyclic graph of FIG. 5 is constructed from the tree of FIG. 4 by replacing a leaf numbered k by its k-th parent node. Each node of the graph in FIG. 5 represents a state of the automation. The root of the tree is the initial state of the automation. As shown in the cyclic graph of FIG. 5, performing the action a in the initial state leads to a state in which performing c returns to the root node (initial state). In contrast, performing action b in the initial state leads to a state where actions d and e are possible. Performing d returns to the root node, while performing e merely cycles back to itself. Automata of this form are a subset of the processes describable by process algebra. The individual programs to be generated are restricted to this subset.

The initial population of chromosomes in this example includes randomly generated trees with an average of eight nodes and an average number of two successors per node. Each labeled edge, i.e., the edges a-e in FIG. 4, represents some communication action. In various exemplary embodiments, the action could be sending or receiving a message. In various other exemplary embodiments, the action could be performing a process on a signal, such as modulation or filtering the signal. The individual actions in each tree combine to form a communication process.

In this second exemplary embodiment, the fitness of an individual chromosome is determined by first computing the process 320 corresponding to the chromosome. Determining the corresponding process 320 for an individual chromosome involves transforming the cycles of FIG. 5 into mathematical expressions of the behavior of each sub-process a-e. This process 320 is then composed in parallel with the known environment 330 shown in FIG. 3, while hiding all communication actions between the new process 320 and the environment 330 to form a new process 310. Then, the distance between the semantics of this new process 310 and the semantics of the specification process 360 is determined using the metric space semantics. Next, the number of nodes of the chromosome used in defining the new process 310 is determined. The fitness of the chromosome becomes a maximum of d and $k/k_o \cdot d$, where $k_o$ is an expected maximum size of a chromosome, k is the actual size of the chromosome, and d is the computed distance. Any chromosome larger than $k_o$ will receive a fitness penalty, causing chromosomes with identical behavior but simpler structure to be favored.

Figure 6:
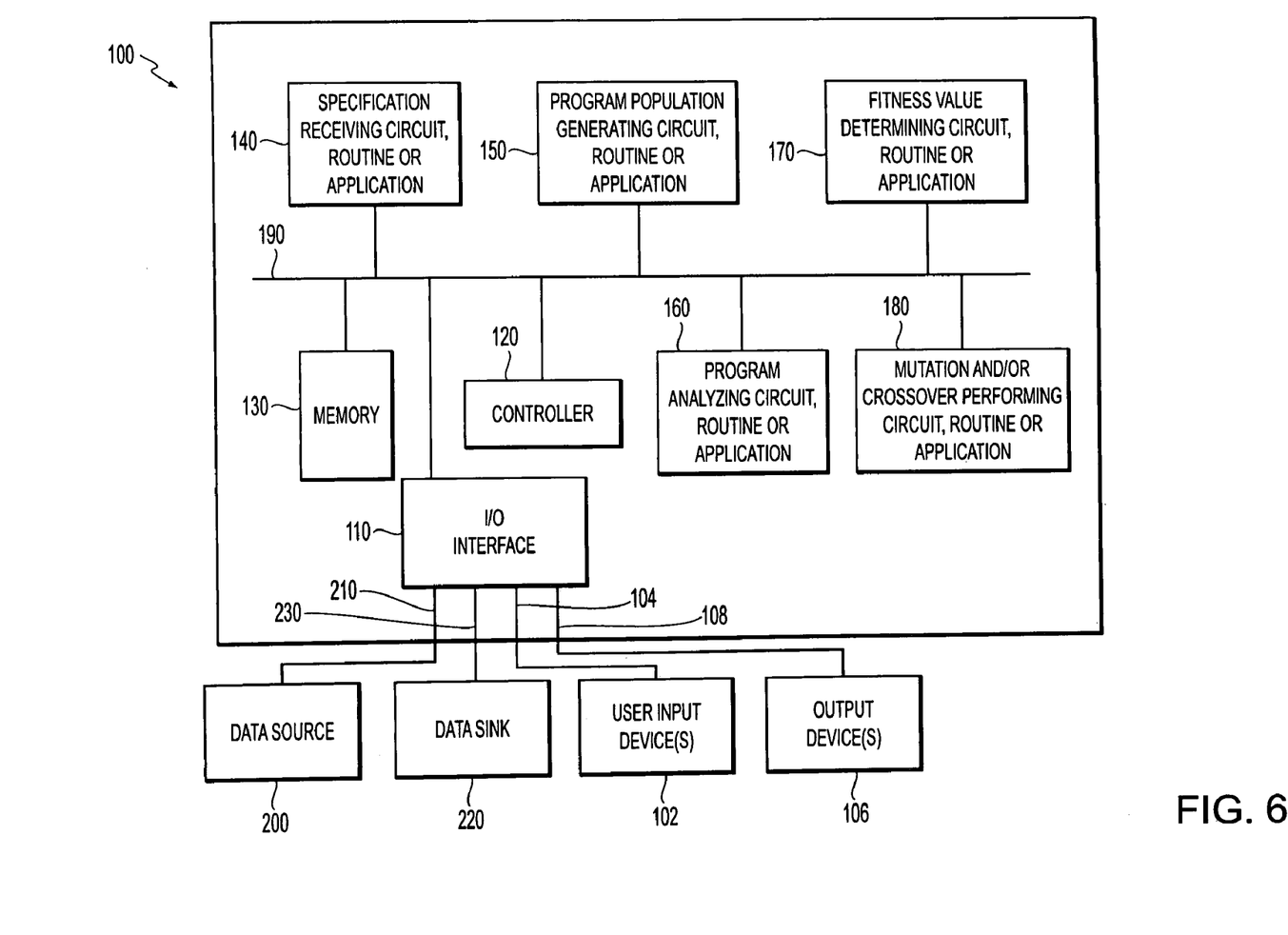
FIG. 6 is a block diagram illustrating one exemplary embodiment of a system for generating provably correct program code according to this invention.

FIG. 6 is a block diagram of one exemplary embodiment of a code generating system 100 usable to evolve a program according to this invention, so that the generated code is provably correct with respect to a given specification. As shown in FIG. 6, the code generating system 100 includes an input/output interface 110, a controller 120, a memory 130, a specification receiving circuit, routine or application 140, a program population generating circuit, routine or application 150, a program analyzing circuit, routine, or application 160, a distance value determining circuit, routine or application 170, and a mutation and/or crossover generating circuit, routine or application 180, appropriately interconnected by one or more control and/or data busses and/or application program interfaces 190.

As shown in FIG. 6, the code generating system 100 is, in various exemplary embodiments, implemented using a programmed general purpose computer. However, the code generating system 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device, such as a PLD, PLA, FPGA or PAL, or the like. In general, any device, capable of implementing a finite state machine that is in turn capable of implementing the flowcharts shown in FIGS. 1 and 2, can be used to implement the code generating system 100.

As shown in FIG. 6, the memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the various circuits, routines or applications 140, 150, 160, 170 and 180 shown in FIG. 6 can be implemented as portions of a suitably programmed general purpose computer. Alternatively, each of the circuits, routines or applications shown in FIG. 6 can be implemented as physically distinct hardware circuits within an ASIC, or using a FPGA, a PLD, a PLA or a PAL, or using discrete logic elements or discrete circuit elements. Alternatively, each of the circuits, routines or applications shown in FIG. 5 can be implemented as individual application units, objects, routines, subroutines, procedures or the like stored in the memory 130 of the code generating system 100. The particular form each of the circuits, routines, applications or procedures shown in FIG. 6 will take is a design choice and will be obvious and predicable to those skilled in the art.

It should be appreciated that individual application units, objects, routines, subroutines, procedures or the like, collectively referred to herein as a procedure, can be a self-consistent sequence of computerized steps that lead to a desired result. These steps can be defined by and/or in one or more computer instructions. These steps can be performed by a computer executing the instructions that define the steps. Thus, the term "procedure" can refer to, for example, a sequence of instructions, a sequence of instructions organized within a programmed-procedure or programmed-function, and/or a sequence of instructions organized within programmed-processes executing in one or more computers. Such a procedure can also be implemented directly in circuitry that performs the procedure. Further, computer-controlled methods can be performed by a computer executing one or more appropriate programs, by special purpose hardware designed to perform the method, or any combination of such hardware, firmware and/or software elements.

As shown in FIG. 6, one or more user input devices(s) 102, one or more output device(s) 106, a data source 200, and/or a data sink 220 can be connected to the input/output interface 110 by links 104, 108, 210 and 230 respectively.

Each of the one or more user input device(s) 102 may be one or any combination of multiple input device, such as a keyboard, a mouse, a joy stick, a trackball, a touch pad, a touch screen, a pen-based system, a microphone and associated voice recognition software, or any other known or later developed devices for inputting data and/or user commands to the system 100. It should be understood that the one or more user input device(s) 102, of FIG. 6 do not need to be the same type of device.

In general, the data source 200 shown in FIG. 6 can be any known or later-developed device that is capable of providing appropriate data to the code generating system 100. In general, the data sink 220 shown in FIG. 6 can be any known or later-developed device that is capable of receiving the provably correct code generated by the code generating system 100. In general, the one or more output device(s) 106 can be any known or later-developed devices that is capable of outputting or displaying data, such as the generated provably correct code, to a user or other person.

Each of the links 104, 108, 210 and 230 connecting the user input device(s) 102, the one or more output devices 106, the data source 200, and the data sink 220 to the code generating system 100can be a direct cable connection, a modem, a local area network, a wide area network, an intranet, the Internet, any other distributed processing network, or any other known or later developed connection device. It should be appreciated that each of these links 104, 108, 210 and 230 may include wired or wireless portions. In general, each of the links 104, 108, 210 and 230 can be implemented using any known or later-developed connection system or structure usable to connect the respective devices to the code generating system 100. It should be understood that the links 104, 108, 210 and 230 do not need to be of the same type.

In various exemplary embodiments, the program population generating circuit, routine or application 150 generates an initial population of programs. In various other exemplary embodiments, the initial population of programs may be input by a user through one or more of the user input device(s) 102 or can be uploaded from the data source 200. The program analyzing circuit, routine or application 160 selects an individual program from the initial population and analyzes it to determine the actual behavior of that selected program. The distance value determining circuit, routine or application 170 implements a fitness function by computing the distance between the specification and the meaning of an individual program as determined by the program analzying circuit, routine or application 160.

In operation, of the code generating system 100 inputs or is otherwise provided with a specification that formalizes the desired program behavior of a particular program to be evolved by the code generating system 100. In various exemplary embodiments, the specification may be provided to the specification receiving circuit, routine, or application 140 from the data source 200. In various other exemplary embodiments, the specification can be input through one or more of the user input devices 102, and may include data from the data source 200, to the specification receiving circuit, routine or application 140.

Once the distance value has been derived for the current program, the value is associated with that current program and the program and the value are stored in memory 130. The program analyzing circuit, routine or application 160 will continue analyzing each program in the population until the distance value determining circuit, routine or application determines that the distance value of the current program is zero. If a program from the current population is found to have distance measure of zero, that program is stored separately and an indication signal is sent to the operator over one or more of the output devices 107 indicating that provable correct program has been evolved. If the distance value determining circuit, routine or application 170 has evaluated each individual program in the population without finding a program with a distance measure of zero, the mutation and/or crossover performing circuit, routine or application 180 is invoked.

The mutation and/or crossover performing circuit, routine or application 180 performs any combination of mutation and/or crossover operations on the fittest individuals of the previous generation as measured by the distance value determining circuit, routine or application 170, to create the current population of programs for the next generation. In various exemplary embodiments, the current population of programs for the next generation will replace the previous population. The population created by the mutation and/or cross over performing circuit, routine or application 180 is stored in memory 130 or in the alternative, in the data sink 200. In various exemplary embodiments, each new population of programs created by the mutation and/or crossover performing circuit, routine or application will overwrite the previous population of programs stored in memory. The new population of programs becomes the current population of programs and the process of the code determining system 100 repeats staring with the program executing circuit, routine or application 160 selecting and executing each program of the current population. The provably correct code determining system 100 continues to operate in this manner recursively until a program is evolved which satisfied the specification.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications variations, improvements, and/or substantial equivalents.

What is claimed is:

1. A computer implemented method of generating a computer program using genetic programming techniques, comprising:
    providing a specification which defines a desired program behavior;
    creating a current population of programs, each program having an actual behavior;
    providing a mapping that maps each program in the current population onto the specification of the desired program behavior without the need for executing the program;
    computing, for each program in the current population, a fitness for that program using a fitness function that computes the difference between the mapping of the program and the specification of the desired program behavior; and,
    when an acceptable computed fitness has been calculated for one of the programs, outputting that program as a provable correct program.

2. The method of claim 1, wherein computing the fitness for each program comprises determining a measure of a distance between the mapping of the program and the specification.

3. The method of claim 2, further determining that a program satisfies the specification when the fitness function returns a distance that is within an acceptable tolerance.

4. The method of claim 2, further determining that a program satisfies the specification when the fitness function returns a distance of zero.

5. The method of claim 1, further comprising creating a new population of programs by performing at least one of a mutation operation and a crossover Operation on at least one selected program in the population of programs when all programs in the population have been analyzed for fitness without sufficiently satisfying the specification.

6. The method of claim 1, wherein said mapping comprises denotational semantics techniques.

7. The method of claim 1, further comprising sending an indication signal indicating that a provable correct program has been evolved.

8. A computerized system that generates programming code using genetic programming techniques, comprising:
    a specification receiving circuit, routine or application that receives a specification defining at least one desired program behavior;
    a current program population generating circuit, routine or application that generates a population of computer programs, each program having an actual behavior;
    a program analyzing circuit, routine or application that maps each program in the current population onto the specification without executing the program;
    a fitness determining circuit, routine or application that determines a fitness of a program in satisfying the specification based on the mapping onto the received specification and a defined fitness function, and when an acceptable computed fitness has been determined for one of the programs, outputs that program as a provable correct program.

9. The system of claim 8, wherein the fitness determining circuit, routine or application applies the fitness function to a program to determine a measure of a distance between the mapping of that program and the specification.

10. The system of claim 9, wherein the fitness determining circuit, routine or application determines tat a program satisfies the specification when the mapping of tat program has a distance value within an acceptable tolerance.

11. The system of claim 9, wherein the fitness determining circuit, routine or application determines that a program satisfies the specification when the mapping of that program has a distance value of zero.

12. The system of claim 8, further comprising a new population generating circuit, routine or application that creates a new population of programs by applying at least one of a mutation operation and a crossover operation on at least one selected program of the current population of programs when all programs in the current population have been analyzed for fitness without any programs sufficiently satisfying the specification.

13. The system of claim 8, wherein the program analyzing circuit, routine or application uses denotational semantics techniques to formalize the actual behavior of each program.

14. A storage medium storing a set of program instructions executable on a data processing device and usable to generate a computer program using genetic programming techniques, comprising:
- instructions for receiving a specification of the desired program behavior;
- instructions for creating a current population of computer programs, each program having a meaning;
- instructions for mapping each of said programs onto said specification without executing the program; and
- instructions for applying a fitness function to analyze a fitness of the mapping of a program in satisfying the specification and when an acceptable computed fitness has been calculated for one of the programs, outputting that program as a provable correct program.

15. The storage medium according to claim 14, wherein the instructions for applying a fitness function to analyze a fitness of the program comprise instructions for applying the fitness function to determine a measure of a distance value between the mapping of the program and the specification.

16. The computer-readable storage medium according to claim 15, further comprising instructions for determining that a program satisfies the specification when the distance value of the fitness function is within an acceptable tolerance.

17. The computer-readable storage medium according to claim 15, further comprising instructions for determining that a program satisfies the specification when the distance value of the fitness function is zero.

18. The computer-readable storage medium according to claim 14, further comprising instructions for creating a new population of programs by performing at least one of a mutation operation and a crossover operation on at least one individual in the current population of programs when all programs in the current population have been analyzed for fitness without any programs sufficiently satisfying the specification.

19. The computer-readable storage medium according to 14, further comprising instructions that apply denotational semantics techniques to map the program onto said specification.

* * * * *